United States Patent
Hamanaka

(10) Patent No.: US 7,986,813 B2
(45) Date of Patent: Jul. 26, 2011

(54) OBJECT POSE ESTIMATION AND COMPARISON SYSTEM USING IMAGE SHARPNESS DIFFERENCES, OBJECT POSE ESTIMATION AND COMPARISON METHOD USING IMAGE SHARPNESS DIFFERENCES, AND PROGRAM THEREFOR

(75) Inventor: Masahiko Hamanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 1082 days.

(21) Appl. No.: 10/598,529

(22) PCT Filed: Mar. 3, 2005

(86) PCT No.: PCT/JP2005/004148
§ 371 (c)(1),
(2), (4) Date: Jun. 8, 2007

(87) PCT Pub. No.: WO2005/086089
PCT Pub. Date: Sep. 15, 2005

(65) Prior Publication Data
US 2007/0269080 A1    Nov. 22, 2007

(30) Foreign Application Priority Data
Mar. 3, 2004    (JP) .................................. 2004-059531

(51) Int. Cl.
*G06K 9/00* (2006.01)
(52) U.S. Cl. ...................................... 382/106; 382/118
(58) Field of Classification Search .................. 382/106, 382/118
See application file for complete search history.

(56) References Cited

U.S. PATENT DOCUMENTS

| 6,002,782 A * | 12/1999 | Dionysian ..................... 382/118 |
| 7,099,394 B2 * | 8/2006 | Kohno ..................... 375/240.25 |
| 7,218,773 B2 * | 5/2007 | Ishiyama ..................... 382/154 |
| 7,236,615 B2 * | 6/2007 | Miller et al. .................. 382/118 |
| 7,848,588 B2 * | 12/2010 | Li et al. .......................... 382/255 |
| 2001/0043738 A1 * | 11/2001 | Sawhney et al. ............ 382/154 |
| 2003/0035098 A1 * | 2/2003 | Ishiyama ........................ 356/72 |
| 2003/0161535 A1 * | 8/2003 | Kohno .......................... 382/215 |

FOREIGN PATENT DOCUMENTS

| JP | 9-91436 A | 4/1997 |
| JP | 2001-012925 | 1/2001 |
| JP | 2003-58896 A | 2/2003 |
| JP | 2003-256838 A1 | 9/2003 |
| JP | 2004-054947 A | 2/2004 |

* cited by examiner

*Primary Examiner* — Bhavesh M Mehta
*Assistant Examiner* — Stephen R Koziol
(74) *Attorney, Agent, or Firm* — Dickstein Shapiro LLP

(57) ABSTRACT

A pose estimation and comparison system has a pose estimation and comparison unit. The pose estimation and comparison unit has an pose candidate decision unit which decides an pose candidate. According to the generated pose candidate, a comparison image generation unit generates a plurality of comparison images close to the input image, while projecting a three-dimensional object model obtained from a three-dimensional object model storage unit to a two-dimensional image. A sharpness extraction unit extracts a first sharpness amount reflecting the sharpness from each of the generated comparison images. A weighted difference calculator calculates a plurality of weighted differences by weighting the first sharpness amount to the difference between the input image and each of the comparison images. A determination unit selects a comparison image having the smallest weighted difference as the comparison image closest to the input image, thereby performing the pose estimation and comparison.

10 Claims, 12 Drawing Sheets

OBJECT POSE ESTIMATION AND COMPARISON SYSTEM USING IMAGE SHARPNESS DIFFERENCES, OBJECT POSE ESTIMATION AND COMPARISON METHOD USING IMAGE SHARPNESS DIFFERENCES, AND PROGRAM THEREFOR

TECHNICAL FIELD

The present invention relates to an object pose estimation and comparison system, an object pose estimation and comparison method, and a program therefor. More particularly, the present invention relates to a system, method and program for performing pose estimation and comparison of an object by comparing object images taken at various poses and under various illumination conditions with an object model.

BACKGROUND ART

An example of conventional object pose estimation systems (hereafter, referred as the "conventional technique") is disclosed in Japanese Laid-Open Patent Publication No. 2003-058896. As shown in FIG. 1, this conventional object pose estimation system is composed of an image input unit 10, a three-dimensional object model storage unit 45, and an pose estimation unit 25. The pose estimation unit 25 includes an pose candidate decision unit 30, a comparison image generation unit 40, a difference calculator 55, and a determination unit 56.

The conventional object pose estimation system configured in this manner operates as described below. The three-dimensional object model storage unit 45 prestores a plurality of three-dimensional object models generated by measuring a plurality of objects. The pose estimation unit 25 performs pose estimation by comparing an input image input from the image input unit 10 with a three-dimensional object model retrieved from the three-dimensional object model storage unit 45.

Specifically, the pose candidate decision unit 30 first generates a plurality of pose candidates and outputs them to the comparison image generation unit 40. According to the generated pose candidates, the comparison image generation unit 40 generates a plurality of comparison images whose illumination conditions are close to those of the input image, while projecting the three-dimensional object model to a two-dimensional image, and outputs the generated comparison images to the difference calculator 55. The difference calculator 55 compares the input image from the image input unit 10 with the comparison images from the comparison image generation unit 40 to calculate a difference for each of the comparison images, and outputs the calculated differences to the determination unit 56. The determination unit 56 selects a comparison image closest to the input image from among the plurality of comparison images based on the calculated differences to estimate an optimal pose, and outputs the estimation result.

The conventional techniques described above have problems as follows. Even if the object of the three-dimensional object model is the same as the object of the input image, the difference between the input image and the comparison image will sometimes become small enough (or the similarity will become great enough) to lead to erroneous pose estimation, if the pose estimated from the three-dimensional object model does not match the object pose of the input image. Even if the object of the three-dimensional object model is different from the object of the input image, the difference between the input image and the comparison image will sometimes become small enough to lead to erroneous pose estimation.

This is for the reason that, according to the conventional technique, pose estimation is performed by generating several comparison images close to the input image from the three-dimensional object model, and selecting a comparison image closest to the input image by only the comparison between the input image and the several comparison images. This means that, if the pose estimated from the three-dimensional object model does not match the object pose of the input image, the difference becomes relatively high since positions of edges or the like are different when the generated comparison images have similar sharpness to that of the input image. However, if the generated comparison images have lower sharpness than that of the input image, the error at the edges of the comparison images is reduced. In this case, the difference between the input image and the comparison images becomes relatively small. As a result, the difference between the input image and a comparison image at a wrong pose may become the smallest due to slight noise or the like.

When the object comparison is performed, the comparison is executed by selecting an object having the smallest difference between an optimal comparison image obtained from the three-dimensional object models and the input image. However, if the difference is found only by the comparison between the input image and the comparison images, the difference may become small enough even for a wrong object to lead to an erroneous comparison result.

It is therefore an object of the present invention to provide an object pose estimation and comparison system, and an object pose estimation and comparison method which are capable of performing highly precise pose estimation and comparison on object images taken at various poses and under various illumination conditions.

It is another object of the present invention to provide an object comparison system and an object comparison method which are capable of performing highly precise comparison on object images taken at various poses and under various illumination conditions.

DISCLOSURE OF THE INVENTION

A first aspect of the present invention provides an pose estimation system for performing object pose estimation by comparing an input image with a three-dimensional object model. The pose estimation system includes an pose candidate decision unit for generating at least one pose candidate; a comparison image generation unit for generating, according to the generated pose candidate, a plurality of comparison images close to the input image, while projecting the three-dimensional object model to a two-dimensional image; and a first sharpness extraction unit for extracting a first sharpness amount reflecting the sharpness from each of the plurality of comparison images. The pose estimation system further includes a weighted difference calculator for calculating a plurality of weighted differences by weighting the first sharpness amount to the difference between the input image and each of the comparison images; and a determination unit for selecting a comparison image having the smallest weighted difference among the plurality of weighted differences and estimating an optimal pose based on the selected comparison image.

A second aspect of the present invention provides an pose estimation and comparison system using the pose estimation system described above. In the pose estimation and comparison system, the determination unit further performs object comparison by comparing the minimum weighted difference of the estimated optimal pose with a predetermined threshold value.

A third aspect of the present invention provides a comparison system for performing object comparison by comparing an input image with an object model. The comparison system includes a comparison image generation unit for generating a plurality of comparison images close to the input image from the object model; and a first sharpness extraction unit for extracting a first sharpness amount reflecting the sharpness from each of the plurality of comparison images. The comparison system further includes a weighted difference calculator for calculating a plurality of weighted differences by weighting the first sharpness amount to the difference between the input image and each of the comparison images; and a determination unit for performing object comparison by comparing the calculated plurality of weighted differences with a preset threshold value.

The system according to any of the first to third aspects may further include a second sharpness extraction unit for extracting a second sharpness amount reflecting the sharpness from the input image. In this case, the weighted difference calculator calculates a plurality of weighted differences by weighting the difference between the second sharpness amount of the input image and the first sharpness amount of each of the comparison images to the difference between the input image and the comparison image.

A fourth aspect of the present invention provides an pose estimation method for performing object pose estimation by comparing an input image with a three-dimensional object model. The pose estimation method includes generating at least one pose candidate; and generating, according to the pose candidate, a plurality of comparison images close to the input image, while projecting the three-dimensional object model to a two-dimensional image. The pose estimation method further includes extracting a first sharpness amount reflecting the sharpness from each of the plurality of comparison images; and calculating a plurality of weighted differences by weighting the first sharpness amount to the difference between the input image and each of the comparison images.

A fifth aspect of the present invention provides an pose estimation and comparison method employing the pose estimation method according to the fourth aspect described above. The pose estimation and comparison method further includes selecting a comparison image having the smallest weighted difference among the plurality of weighted differences; and estimating an optimal pose based on the selected comparison image.

The method according to the fourth or fifth aspect may further include extracting a second sharpness amount reflecting the sharpness from the input image. In this case, the calculation of weighted differences is performed by calculating a plurality of weighted difference by weighting the difference between the second sharpness amount of the input image and the first sharpness amount of each of the comparison images to the difference between the input image and the comparison image.

A sixth aspect of the present invention provides an object difference calculation method for comparing an input image with an object model. The object difference calculation method includes generating a plurality of comparison images close to the input image based on the object model; extracting a first sharpness amount reflecting the sharpness from each of the plurality of comparison images; and calculating a plurality of weighted differences by weighting the first sharpness amount to the difference between the input image and each of the comparison images.

The object difference calculation method may further include extracting a second sharpness amount reflecting the sharpness from the input image. In this case, the weighted difference calculation is performed by calculating a plurality of weighted differences by weighting the difference between the second sharpness amount of the input image and the first sharpness amount of each of the comparison images to the difference between the input image and the comparison image.

A seventh aspect of the present invention provides an object comparison method employing the object difference calculation method described above. The object comparison method is able to perform object comparison by comparing the plurality of weighted differences obtained by the calculation.

An eighth aspect of the present invention provides an pose estimation program causing a computer to execute object pose estimation by comparing an input image with a three-dimensional object model. The processing executed in the pose estimation program includes: pose candidate decision processing for generating at least one pose candidate; comparison image generation processing for generating, according to the generated pose candidate, a plurality of comparison images close to the input image, while projecting the three-dimensional object model to a two-dimensional image; and first sharpness extraction processing for extracting a first sharpness amount reflecting the sharpness from each of the plurality of comparison images. The processing executed in the pose estimation program further includes: weighted difference calculation processing for calculating a plurality of weighted differences by weighting the first sharpness amount to the difference between the input image and each of the comparison images; and pose estimation processing for selecting a comparison image having the smallest weighted difference among the plurality of weighted differences and estimating an optimal pose based on the selected comparison image.

A ninth aspect of the present invention provides an pose estimation and comparison program employing the pose estimation program described above. In the pose estimation and comparison program, object comparison is performed by further comparing the minimum weighted difference of the estimated optimal pose with a predetermined threshold value in the pose estimation processing.

A tenth aspect of the present invention provides a comparison program causing a computer to execute object comparison by comparing an input image with an object model. The processing executed in the comparison program includes comparison image generation processing for generating a plurality of comparison images close to the input image from the object model; first sharpness extraction processing for extracting a first sharpness amount reflecting the sharpness from each of the plurality of comparison images; weighted difference calculation processing for calculating a plurality of weighted differences by weighting the first sharpness amount to the difference between the input image and each of the comparison images; and comparison processing for performing comparison by comparing the plurality of weighted differences obtained by the calculation.

In any of the eighth to tenth aspects, second sharpness extraction processing may be further executed for extracting a second sharpness amount reflecting the sharpness from the input image. In this case, the weighted difference calculation processing calculates a plurality of weighted differences by weighting the difference between the second sharpness amount of the input image and the first sharpness amount of each of the comparison images to the difference between the input image and the comparison image.

BEST MODE FOR CARRYING OUT THE INVENTION

Several preferred embodiments of the present invention will be described with reference to the accompanying drawings.

Figure 1:
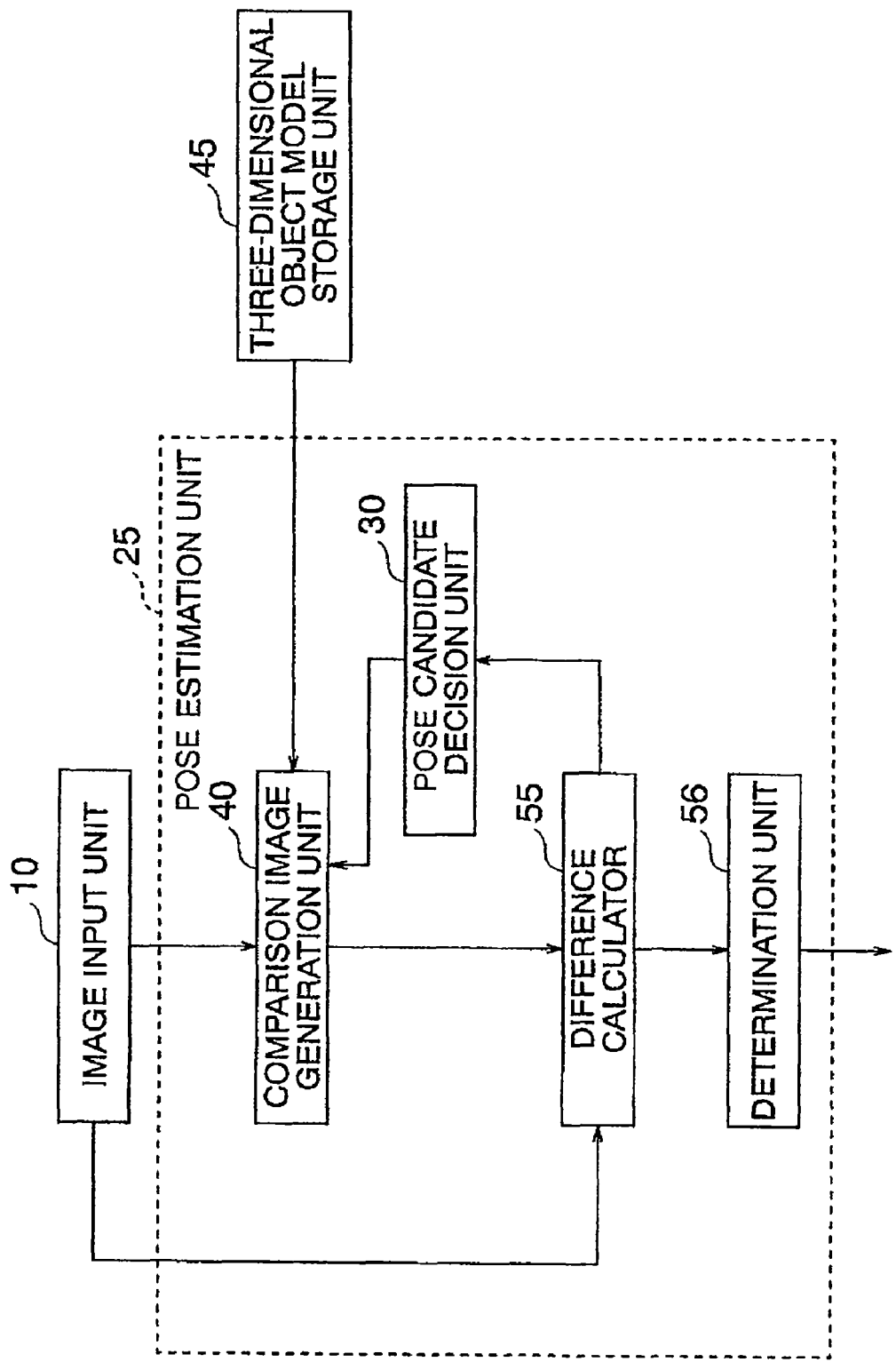
FIG. 1 is a block diagram showing configuration of a conventional object pose estimation system.
Figure 2:
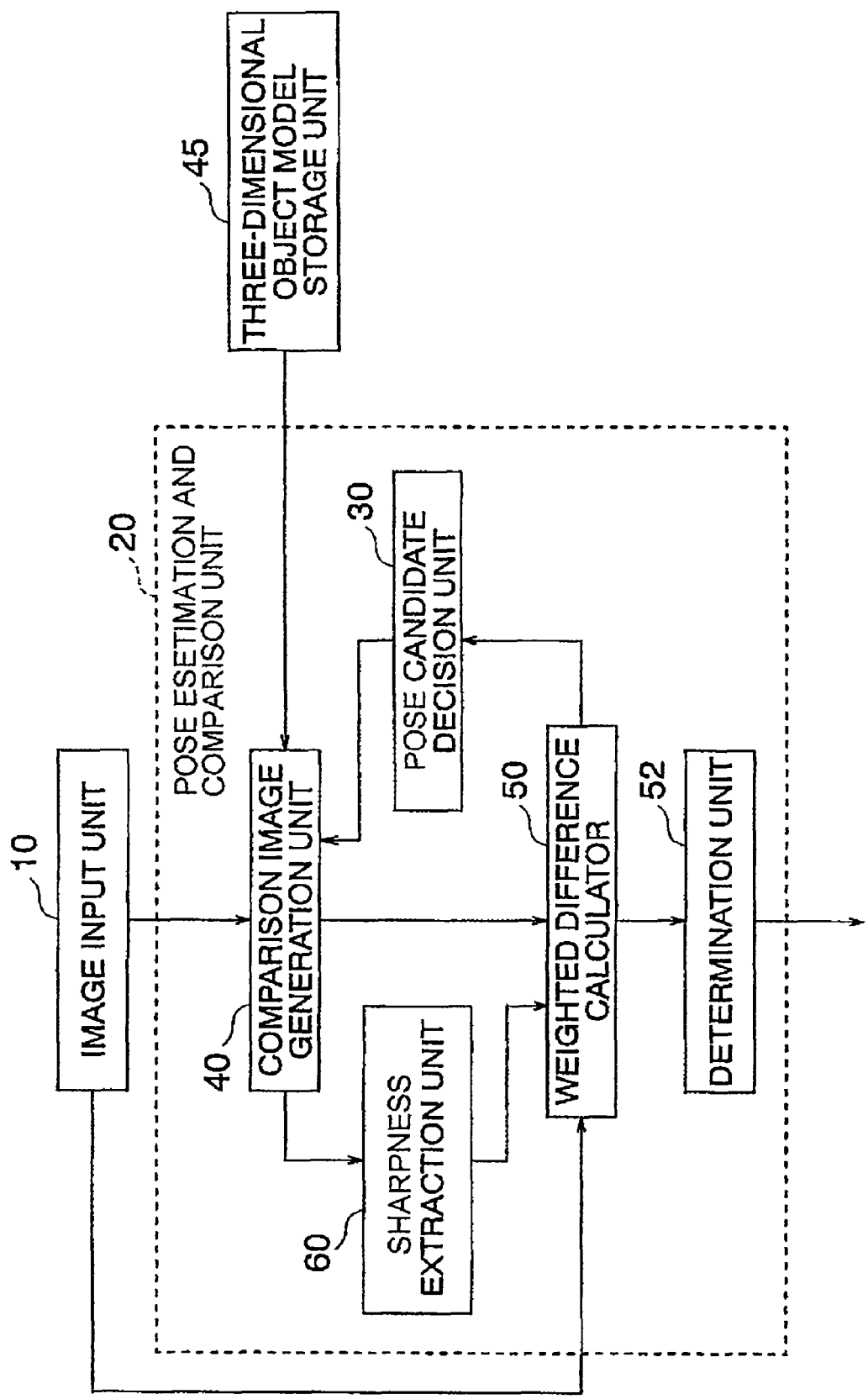
FIG. 2 is a block diagram showing configuration of an object pose estimation and comparison system according to a first embodiment of the present invention.

FIG. 2 shows a first embodiment of an object pose estimation and comparison system according to the present invention. In FIG. 2, the same components as those shown in FIG. 1 are denoted by the same reference numerals. The object pose estimation and comparison system is composed of an image input unit 10 embodied by a video camera or the like, a three-dimensional object model storage unit 45, and an pose estimation and comparison unit 20. The pose estimation and comparison unit 20 includes an pose candidate decision unit 30, a comparison image generation unit 40, a sharpness extraction unit (first sharpness extraction unit) 60, a weighted difference calculator 50, and a determination unit 52.

The three-dimensional object model storage unit 45 pre-stores three-dimensional object models of a plurality of objects. The three-dimensional object models can be generated by using a three-dimensional shape measurement apparatus disclosed in Japanese Laid-Open Patent Publication No. 2001-12925, for example. Alternatively, the three-dimensional object models can be generated by using an apparatus for restoring a three-dimensional shape from a plurality of images taken by a multiplicity of cameras, disclosed in Japanese Laid-Open Patent Publication No. H09-91436. Since the method of generating the three-dimensional object models does not constitute the gist of the present invention, detailed description thereof will be omitted herein.

The pose estimation and comparison unit 20 performs object pose estimation and object comparison by comparing an input image obtained from the image input unit 10 with a three-dimensional object model obtained from the three-dimensional object model storage unit 45.

Specifically, the pose candidate decision unit 30 first generates at least one pose candidate. Preferably, the pose candidate decision unit 30 generates a plurality of pose candidates. The following description will be made on a case in which a plurality of pose candidates are generated. The comparison image generation unit 40 receives an input image from the image input unit 10. In accordance with the generated plurality of pose candidates, the comparison image generation unit 40 generates a plurality of comparison images whose illumination conditions are close to those of the input image while projecting the three-dimensional object model obtained from the three-dimensional object model storage unit 45 to a two-dimensional image. The sharpness extraction unit 60 extracts a sharpness amount reflecting the sharpness from each the generated comparison images as sharpness (hereafter, referred to as the "first sharpness amount"). The weighted difference calculator 50 calculates a difference, for each of the comparison images, by weighting the first sharpness amount to the difference between the input image from the image input unit 10 and the comparison image generated by the comparison image generation unit 40 with (the difference thus obtained is hereafter to be referred as the "weighted difference"). The determination unit 52 selects a comparison image closest to the input image (that is, a comparison image with minimum difference) from among the plurality of comparison images based on the plurality of weighted differences, and estimates an optimal pose from the selected comparison image.

As described in more detail later, the determination unit 52 is capable of performing one-to-one comparison which is comparison processing with respect to one object (three-dimensional object model), and one-to-N object comparison in which an object closest to the input image is found from among a plurality of three-dimensional object models. When performing one-to-one comparison, the determination unit 52 compares a minimum difference with a preset threshold value to determine whether the objects match or not. In case of the one-to-N comparison, the determination unit 52 performs object comparison by selecting a three-dimensional object model having the smallest difference among the plurality of minimum differences obtained with respect to a plurality of three-dimensional object models.

Figure 3:
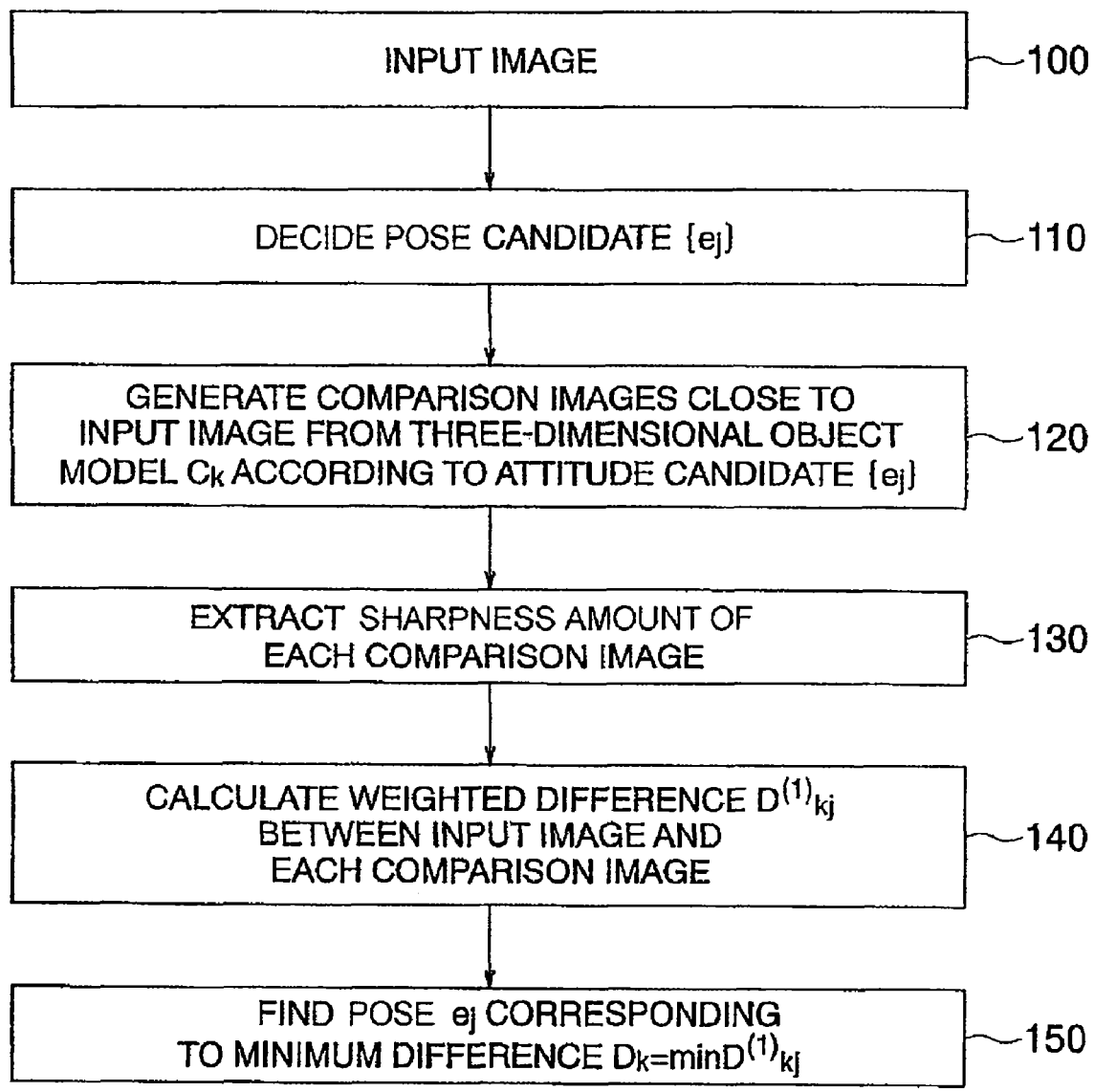
FIG. 3 is a flowchart for explaining the operation of the object pose estimation according to the first embodiment.

Referring to FIGS. 2 and 3, the overall operation of the pose estimation according to the first embodiment will be described in detail. The description will be made on a case in which an input image is compared with a three-dimensional object model Ck.

As shown in FIG. 3, the processing starts with an input image being obtained by the image input unit 10 (step 100). The pose candidate decision unit 30 then decides a plurality of pose candidates {ej} (step 110). In accordance with the decided pose candidate {ej}, the comparison image generation unit 40 then generates a plurality of comparison images close to the input image while projecting a three-dimensional object model $C_k$ obtained from the three-dimensional object model storage unit 45 to a two-dimensional image (step 120). The sharpness extraction unit 60 then extracts a first sharpness amount reflecting the sharpness from each of the generated comparison images (step 130). Using the first sharpness amount, the weighted difference calculator 50 calculates, for each of the generated comparison images, a weighted difference $D^{(1)}_{kj}$ between the input image and the comparison image (step 140). Based on the calculated weighted difference $D^{(1)}_{kj}$, the determination unit 52 selects a comparison image having the minimum difference $D_k = \min D^{(1)}_{kj}$ from among the plurality of comparison images to thereby find an optimal pose $e_j$ (step 150). In FIG. 2, the line extending from the weighted difference calculator 50 towards the pose candidate decision unit 30 indicates the following POINT. In the operation described above, although an pose having the smallest difference is selected from among the decided plurality of pose candidates {ej}, the processing may return to the pose candidate decision unit 30 to search an pose having the smallest difference while sequentially varying the pose candidate.

The overall operation in the one-to-one comparison according to the first embodiment will be described in detail with reference to FIGS. 2 and 4.

Figure 4:
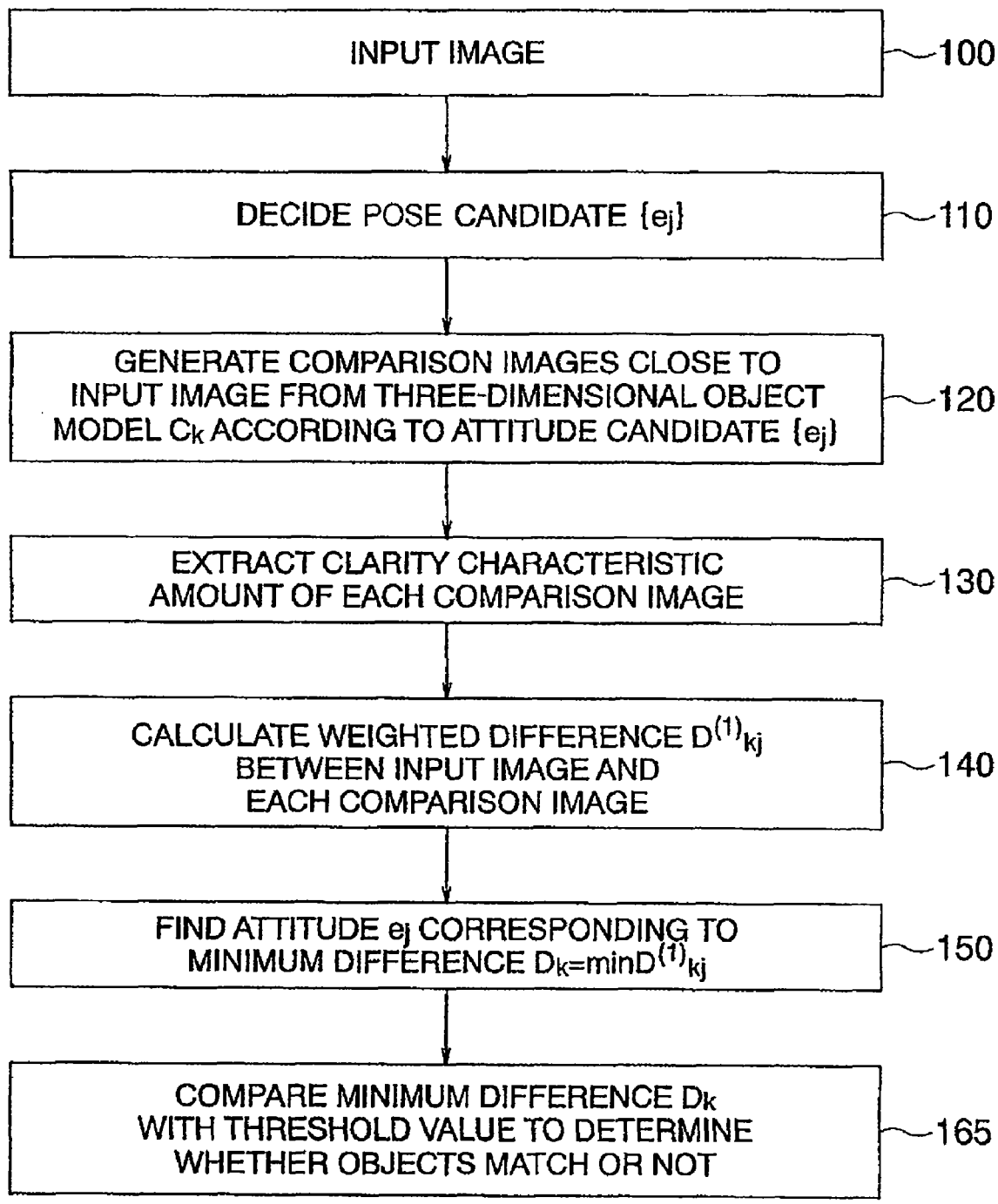
FIG. 4 is a flowchart for explaining the operation of the one-to-one comparison according to the first embodiment.

The processing steps in steps 100 to 150 in FIG. 4 are the same as those in steps 100 to 150 in FIG. 3. In the final step 165 following step 150, the determination unit 52 compares the minimum difference $D_k$ with a predetermined threshold value to determine whether or not the object of the three-dimensional model $C_k$ is the same as the object of the input image. Specifically, the determination unit 52 determines that the two objects are the same one if the minimum difference $D_k$ is smaller than the predetermined threshold value.

The overall operation in the one-to-N comparison according to the first embodiment will be described in detail with reference to FIGS. 2 and 5.

Firstly, the image input unit 10 obtains an input image (step 100). The model number k of the three-dimensional object model is set to 1 (step 160). The processing steps in steps 110 to 150 in FIG. 5 are the same as those in steps 110 to 150 in FIG. 3. Following step 150, the determination unit 52 increments the model number k by 1 (step 161). Subsequently, the processing proceeds to step 162 in which the determination unit 52 determines whether or not the incremented model number k has reached a predetermined number of models M. If the incremented model number k is less than the number of models M, the processing returns to step 110 and the processing steps of steps 110 to 150 are executed. The minimum difference of the three-dimensional object model of the model number (k+1) is obtained by these processing steps. If the incremented model number k has reached the number of models M in step 162, the processing proceeds to step 163, in which the determination unit 52 outputs a three-dimensional object model $C_k$ which has the smallest minimum difference $D_k$ among the M minimum differences $D_k$, as the comparison result.

A description will be made of advantageous effects of the first embodiment.

According to the first embodiment, the first sharpness amount reflecting the sharpness of the comparison image generated from the three-dimensional object model is weighted in the calculation of difference between the input image and the comparison image. Therefore, if the pose or the object of the three-dimensional object model does not match the pose or the object of the input image, a great difference is apt to be generated therebetween, which allows the pose estimation and comparison to be performed with high precision.

Operation of the pose estimation according to the first embodiment will now be described, using specific examples.

Although the following description of the embodiment will be made by taking a human face as an example, it will be obvious that the invention is applicable to other objects as well.

Figure 6:
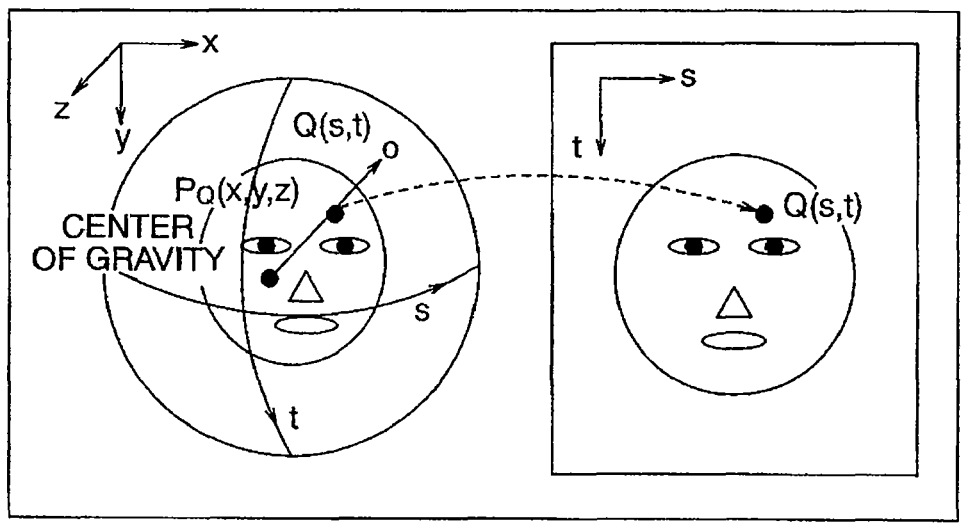
FIG. 6 is a diagram for illustrating a specific example of a three-dimensional object model according to the first embodiment.

The three-dimensional object model storage unit 45 stores a three-dimensional object model of an object k as shown in FIG. 6. FIG. 6 shows only one of a plurality of three-dimensional object models stored in the three-dimensional object model storage unit 45. The three-dimensional object model has, as information, a shape $P_Q(x, y, z)$ and texture $T_Q(R, G, B)$ in the three-dimensional space (x, y, z) on the object surface. Q represents an index of a point on the object surface. For example, it corresponds to the coordinates of a point Q(s, t) obtained by projecting the point on the object surface to a sphere having its center at the center of gravity of the object, from the center of gravity. For rendering the estimation more efficient, learning CG images are previously generated from a three-dimensional object model by computer graphics under various illumination conditions, and the principal components of the learning CG images are analyzed to obtain a group of base images.

Figure 7:
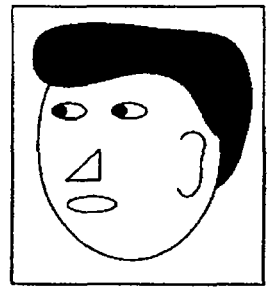
FIG. 7 is a diagram for illustrating a specific example of an input image according to the first embodiment.

It is first assumed that an input image I(r) as shown in FIG. 7 is obtained by the image input unit 10 (step 100 in FIG. 3). Herein, r denotes a pixel.

The pose candidate decision unit 30 then decides a plurality of pose candidates {ej} (step 110). The pose candidates {ej} may be either set regardless of the input image or set in the manner described below. For example, characteristic points such as an eye, nose, or mouth are extracted manually or automatically from the input image and the three-dimensional object model. Subsequently, the pose is roughly estimated by a known method of calculating the position and orientation of an object, based on the characteristic points thus extracted. An pose candidate {ej} is generated around the estimated pose. The method of calculating the position and orientation of an object is for example disclosed in the third patent publication cited above.

Figure 8:
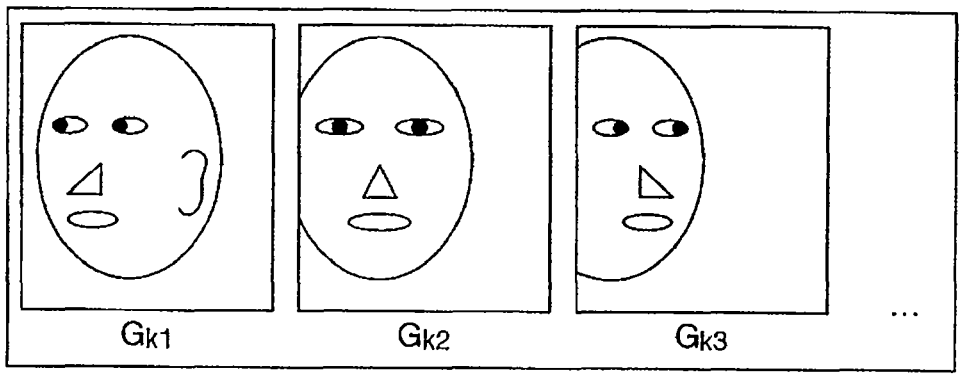
FIG. 8 is a diagram for illustrating a specific example of comparison images according to the first embodiment.

According to the generated pose candidate {ej}, the comparison image generation unit 40 then generates a plurality of comparison images $G_{kj}(r)$ whose illumination conditions are close to those of the input image, while projecting the three-dimensional object model to a two-dimensional image (step 120). The generation of the comparison images whose illumination conditions are close to those of the input image are performed in the manner as described below. The group of base images previously obtained is coordinate-converted based on each of the pose candidates, and a coefficient of the linear sum of the base images thus coordinate-converted is obtained by the least-square method so that the linear sum becomes close to that of the input image. FIG. 8 shows examples of comparison images generated with respect to the input image shown in FIG. 7, while gray-scale information is not illustrated.

The sharpness extraction unit 60 extracts a first sharpness amount $S_{kj}$ reflecting the sharpness from each of the comparison images $G_{kj}(r)$ (step 130). The sharpness amount is an amount representing the degree of variation in the image brightness (color). For example, the first sharpness amount S of the image G(r) can be defined by the ratio Ee/E of the number of pixels Ee whose edge intensity in an edge image G'(r) of the image G(r) is higher than the threshold value to the total number of pixels E. The first sharpness amount S may be represented by using image contrast (a range of brightness values) or dispersion of brightness values.

The weighted difference calculator 50 then obtains a weighted difference $D^{(1)}_{kj}$ between the input image I(r) and the comparison image $G_{kj}(r)$ with the use of the first sharpness amount $S_{kj}$ (step 140). The weighted difference is set such that the difference becomes small when the first sharpness amount extracted from the comparison image is large. For example, when a Euclidean distance is used for the difference $D^{(0)}_{kj}$ between the input image I(r) and the comparison image $G_{kj}$(r), the difference is calculated by the following formula.

$$D^{(0)}_{kj}=\Sigma_r\{I(r)-G_{kj}(r)\}^2$$

The weighted difference $D^{(1)}_{kj}$ is calculated by the following formula.

$$D^{(1)}_{kj}=D^{(0)}_{kj}/\{1+aS_{kj}\} \text{ (where, } a \text{ denotes a weighting factor)}$$

The determination unit 52 then selects a comparison image having the minimum difference $D^{(1)}_k=\min_j D^{(1)}_{kj}$ from among the plurality of comparison images to thereby find an optimal pose $e_j$ (step 150).

For example, in the case of FIG. 8, the pose $e_1$ (comparison image $G_{k1}$) is the optimal pose. Even if the differences $D^{(0)}_{kj}$ between the comparison images and the input image become $D^{(0)}_{kj}=\{100, 95, 120\}$ due to noise or the like, the weighted difference $D^{(1)}_{kj}=\{67, 73, 100\}$ is obtained when the weighting coefficient a=1, if the first sharpness amount $S_{kj}$ of the comparison images are $S_{kj}=\{0.5, 0.3, 0.2\}$. As a result, comparison image $G_{k1}$ is selected and the pose $e_1$ is determined to be the optimal pose.

The foregoing description has been made on a case in which the system is applied as an object pose estimation and comparison system. However, it is obvious that the present invention is also applicable to an object pose estimation system not involving the comparison and an object comparison system not involving the pose estimation. The same can be applied to a second embodiment described below.

The second embodiment of the present invention will now be described in detail.

Figure 9:
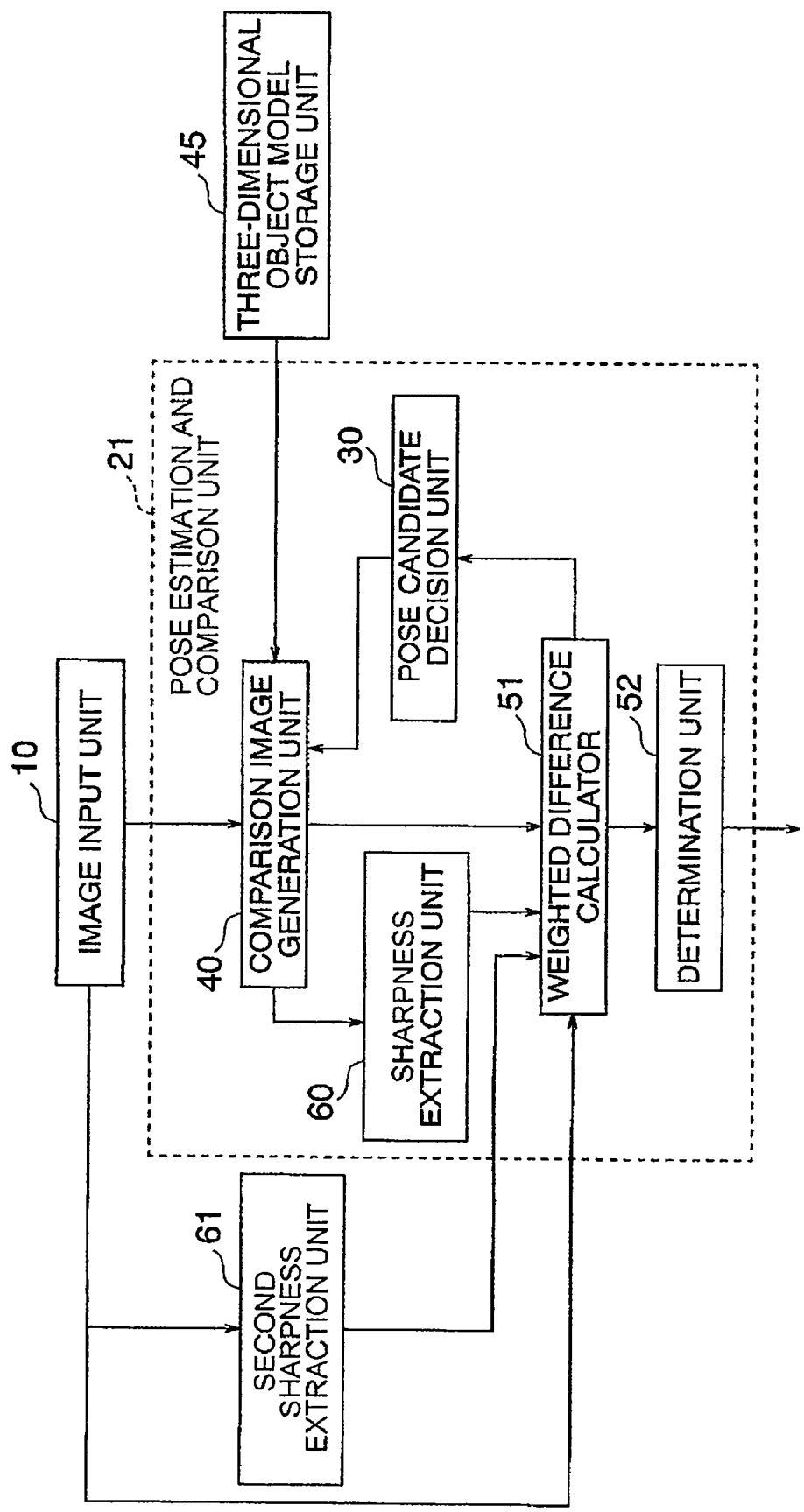
FIG. 9 is a block diagram showing configuration of an object pose estimation and comparison system according to a second embodiment of the present invention.

Referring to FIG. 9, an object pose estimation and comparison system according to the second embodiment of the present invention is composed of an image input unit 10, a second sharpness extraction unit 61, a three-dimensional object model storage unit 45, and an pose estimation and comparison unit 21. The pose estimation and comparison unit 21 includes an pose candidate decision unit 30, a comparison image generation unit 40, a sharpness extraction unit (first sharpness extraction unit) 60, a weighted difference calculator 51, and a determination unit 52.

The image input unit 10, the three-dimensional object model storage unit 45, the pose candidate decision unit 30, the comparison image generation unit 40, and the sharpness extraction unit 60 execute the same processing as the counterparts shown in FIG. 2 do.

The second sharpness extraction unit 61 extracts a second sharpness amount reflecting the sharpness of an input image obtained from the image input unit 10.

The pose estimation and comparison unit 21 performs pose estimation and comparison by comparing the input image obtained from the image input unit 10 with a three-dimensional object model obtained from the three-dimensional object model storage unit 45, using the second sharpness amount of the input image obtained by the second sharpness extraction unit 61.

More specifically, the pose candidate decision unit 30 generates a plurality of pose candidates. In accordance with the generated pose candidates, the comparison image generation unit 40 generates a plurality of comparison images whose illumination conditions or the like are close to those of the input image, while projecting the three-dimensional object model to a two-dimensional image. The sharpness extraction unit 60 extracts a first sharpness amount from each of the generated comparison images. The weighted difference calculator 51 calculates, for each of the comparison images, a weighted difference by weighting the difference between the second sharpness amount of the input image and the first sharpness amount of the comparison image to the difference between the input image and the comparison image. Based on the weighted difference thus calculated, the determination unit 52 estimates an optimal pose by selecting, from among the plurality of comparison images, a comparison image closest to the input image, or having the minimum difference. In the case of one-to-one comparison, the determination unit 52 compares the minimum difference with a predetermined threshold value to determine whether or not the object of the three-dimensional object model is the same as the object of the input image. In the case of one-to-N comparison, as described in FIG. 5, the determination unit 52 selects a three-dimensional object model having the smallest minimum difference from among M three-dimensional object models.

A detailed description will now be made on the overall operation in the pose estimation according to the second embodiment, with reference to FIGS. 9 and 10. In the case of the operation of one-to-one comparison, it is obvious that step 165 of FIG. 4 is executed following step 151 of FIG. 10. Whereas, in the case of the operation of one-to-N comparison, it is obvious that step 160 of FIG. 5 is executed prior to step 110 of FIG. 10, and steps 161 to 163 of FIG. 5 are executed following step 151 of FIG. 10. Therefore, the description of operation after step 151 of FIG. 10 will be omitted.

Figure 10:
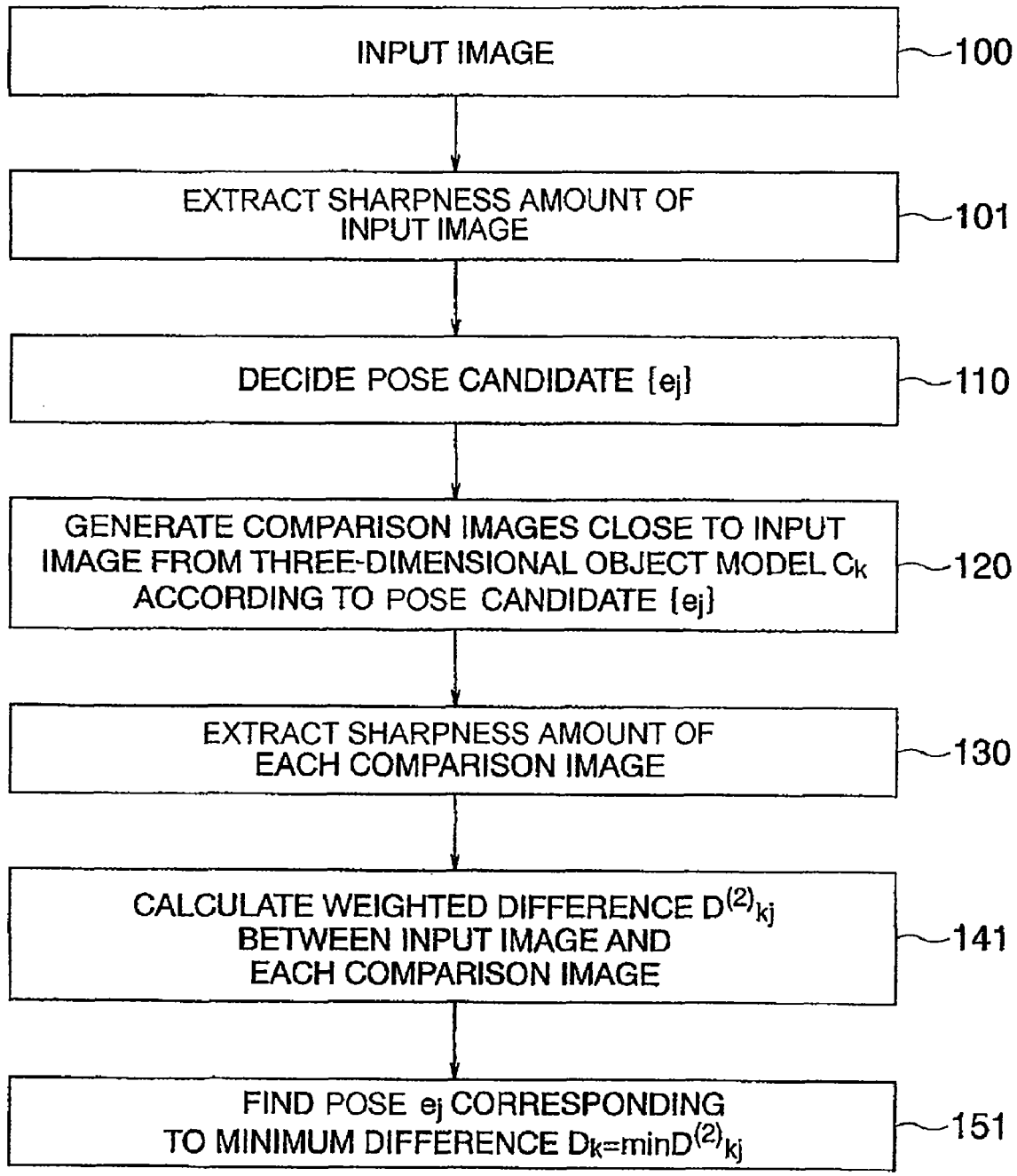
FIG. 10 is a flowchart for explaining the operation of the object pose estimation according to the second embodiment.

Firstly, an input image is obtained by the image input unit 10 (step 100 of FIG. 10). The second sharpness extraction unit 61 extracts a second sharpness amount of the input image (step 101). Subsequently, the pose candidate decision unit 30 decides a plurality of pose candidates {ej} (step 110). In accordance with the decided pose candidates, the comparison image generation unit 40 generates a plurality of comparison images close to the input image while projecting the three-dimensional object model $C_k$ to a two-dimensional image (step 120). The sharpness extraction unit 60 extracts a first sharpness amount from each of the generated comparison images (step 130). The weighted difference calculator 51 finds a weighted difference $D^{(2)}_{kj}$, for each of the comparison images, by using the input image and the generated comparison images, the second sharpness amount of the input image, and the first sharpness amounts of the comparison images (step 141).

For example, when the difference between the input image and the comparison image is denoted by $D^{(0)}_{kj}$, and the difference between the second sharpness amount of the input image and the first sharpness amount of the comparison image is denoted by $D^{(e)}_{kj}$, the weighted difference $D^{(2)}_{kj}$ is calculated by the following formula.

$$D^{(2)}_{kj}=D^{(0)}_{kj}+bD^{(e)}_{kj} \text{ (where } b \text{ denotes a weighting factor)}$$

The difference between the first and second sharpness amounts can be calculated by using Euclidean distance or the like. The determination unit 52 finds an optimal pose ej by selecting a comparison image having the minimum difference from among the plurality of comparison images (step 151).

A description will be made of advantageous effects of the second embodiment.

According to the second embodiment, the difference between the second sharpness amount of the input image and the first sharpness amount of the comparison image is weighted in the calculation of the difference between the input image and the comparison image. Therefore, if the pose or the object of the three-dimensional object model does not match the pose or the object of the input image, the generated difference is apt to be great, and thus the pose estimation and comparison can be performed with high precision.

A third embodiment of the present invention will be described in detail with reference to the drawings.

Figure 11:
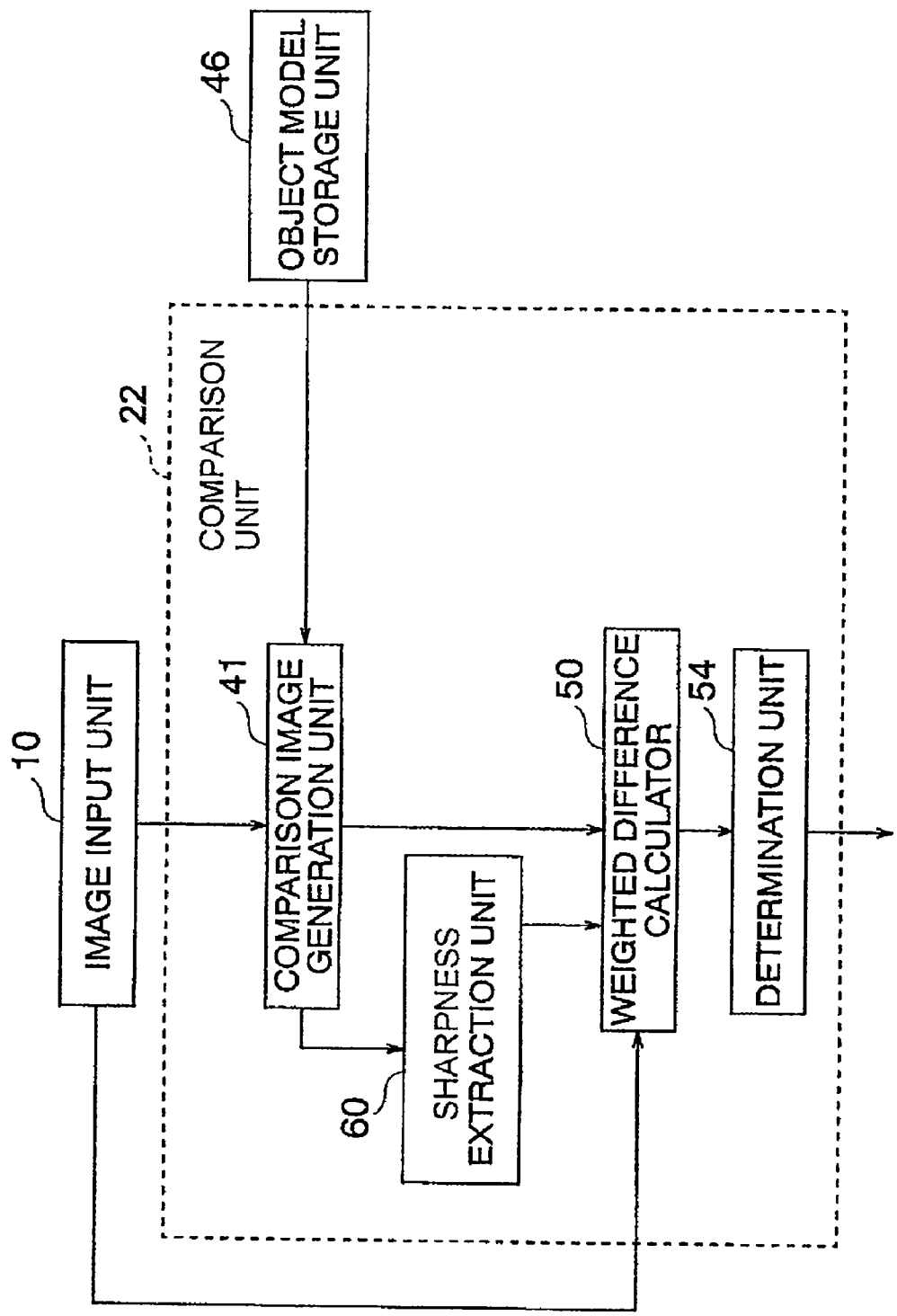
FIG. 11 is a block diagram showing configuration of an object comparison system according to a third embodiment of the present invention.

Referring to FIG. 11, an object comparison system according to the third embodiment of the present invention is composed of an image input unit 10, an object model storage unit 46, and a comparison unit 22. The comparison unit 22 includes a comparison image generation unit 41, a sharpness extraction unit 60, a weighted difference calculator 50, and a determination unit 54.

In the third embodiment, the pose candidate decision unit 30 in the first embodiment is omitted in consideration of the comparison performed when object pose variation is low. The comparison when the object pose variation is low means that the comparison is performed only on an image of the object taken from the front, for example.

The image input unit 10 and the sharpness extraction unit 60 execute the same processing as the counterparts shown in FIG. 2 do.

The object model storage unit 46 prestores object models of a plurality of objects. The object models include information relating to various image variations generated when taking the images of the objects. For example, front-face images of each object are prepared under various illumination conditions, and the principal components of the front-face images are analyzed to obtain a group of base images. This enables the comparison image generation unit 41 to generate comparison images close to the input image by synthesizing the group of base images.

The comparison unit 22 performs comparison by comparing the input image obtained from the image input unit 10 with the object model obtained from the object model storage unit 46.

More specifically, the comparison image generation unit 41 generates a comparison image whose illumination condition or the like is close to that of the input image from the object model obtained from the object model storage unit 46. The sharpness extraction unit 60 extracts a first sharpness amount reflecting the sharpness from the generated comparison image. The weighted difference calculator 50 calculates a weighted difference by weighting the first sharpness amount to the difference between the input image and the generated comparison image. In the case of one-to-one comparison, the determination unit 54 compares the weighted difference obtained by the calculation with a preset threshold value to determine whether or not the object of the object model is the same as the object of the input image. In the case of one-to-N comparison, the determination unit 54 selects an object model having the smallest minimum difference from among the plurality of object models.

A detailed description will be made of the overall operation in the one-to-one comparison according to the third embodiment with reference to FIGS. 11 and 12.

Figure 12:
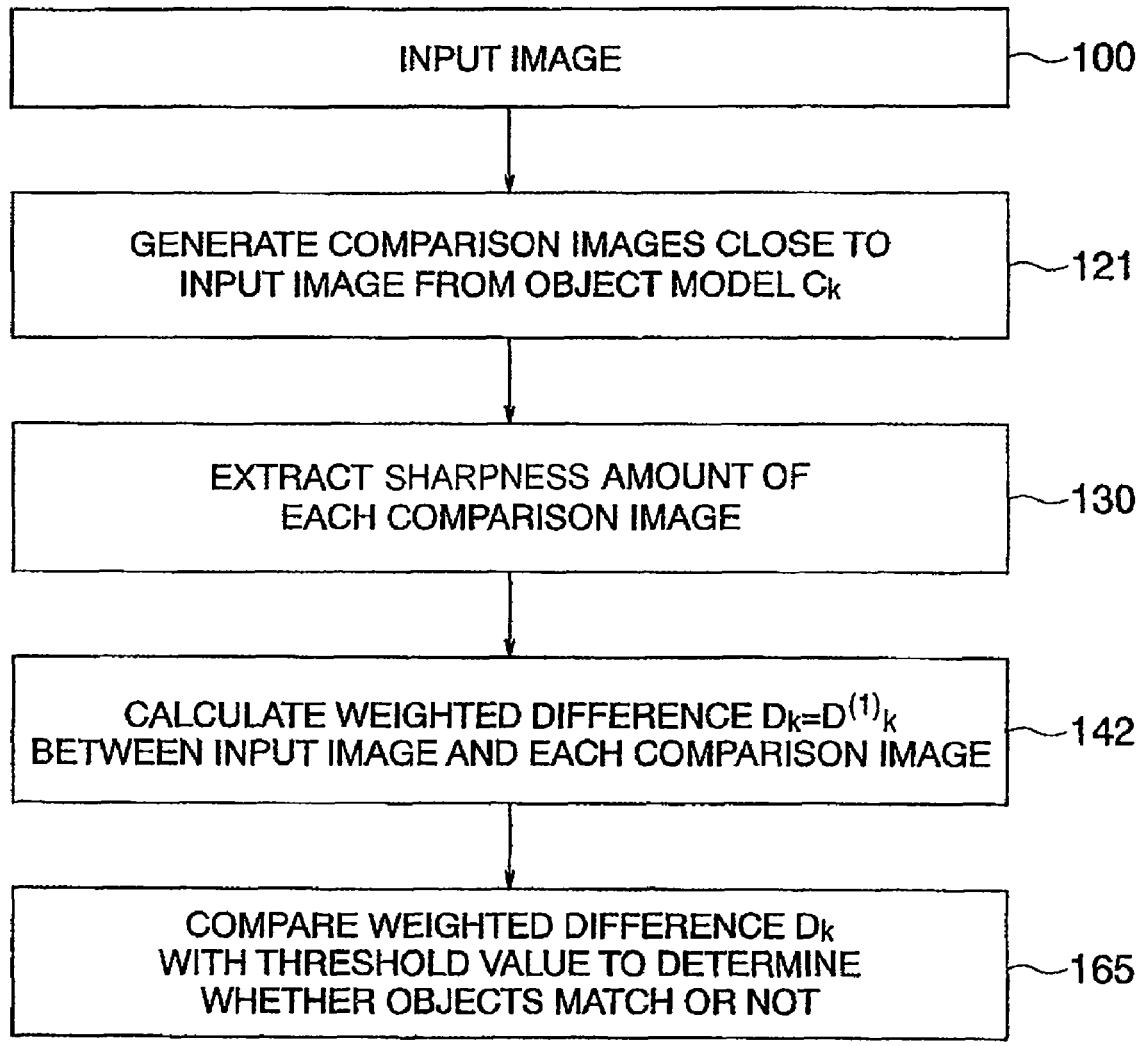
FIG. 12 is a flowchart for explaining the operation of the one-to-one comparison according to the third embodiment.

Firstly, an input image is obtained by the image input unit 10 (step 100 of FIG. 12). The comparison image generation unit 41 then generates a plurality of comparison images close to the input image based on the object model $C_k$ obtained from the object model storage unit 46 (step 121). Subsequently, the sharpness extraction unit 60 extracts a first sharpness amount reflecting the sharpness from each of the comparison images (step 130). The weighted difference calculator 50 calculates, for each of the comparison images, a weighted difference $D_k = D^{(1)}_k$ by weighting the first sharpness amount to the difference between the input image and the comparison image (step 142). Finally, the determination unit 54 compares the weighted difference obtained by the calculation with a preset threshold value to determine whether or not the object of the object model is the same as the object of the input image (step 165). Specifically, it is determined that the objects are the same if the weighted difference obtained by the calculation is smaller than the preset threshold value.

Figure 5:
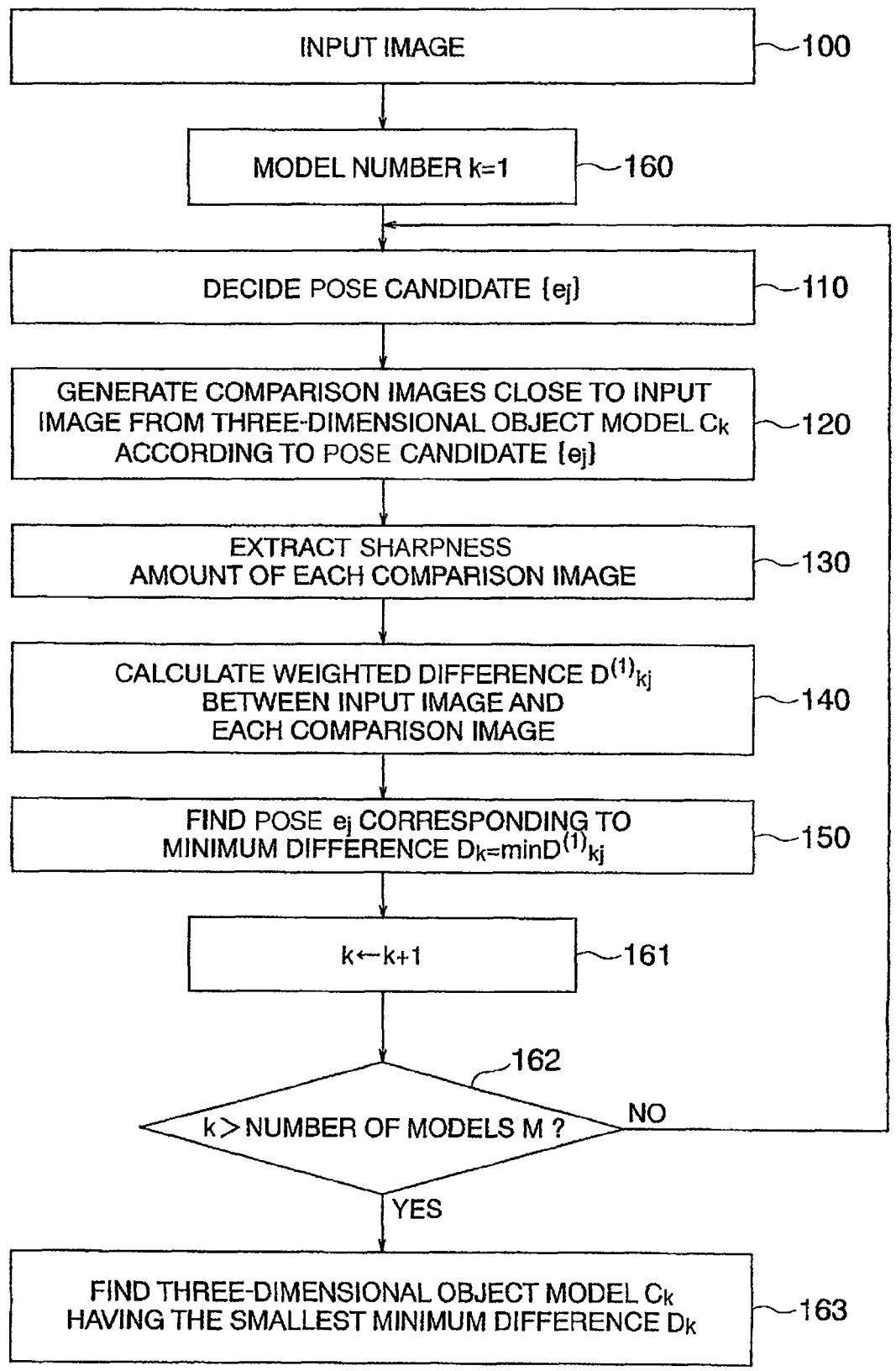
FIG. 5 is a flowchart for explaining the operation of the one-to-N comparison according to the first embodiment.

In the case of one-to-N comparison, the operation is substantially the same as that described in FIG. 5 except that the three-dimensional object model in the one-to-N comparison is replaced by the object model. Therefore, the description thereof is omitted.

A description will be made on advantageous effects of the third embodiment.

In the third embodiment, the first sharpness amount is weighted in the calculation of the difference between the input image and the comparison image. Therefore, if the object of the object model does not match the object of the input image, the generated difference tends to be great, and thus the comparison can be performed with high precision.

A fourth embodiment of the present invention will be described in detail with reference to the drawings.

Figure 13:
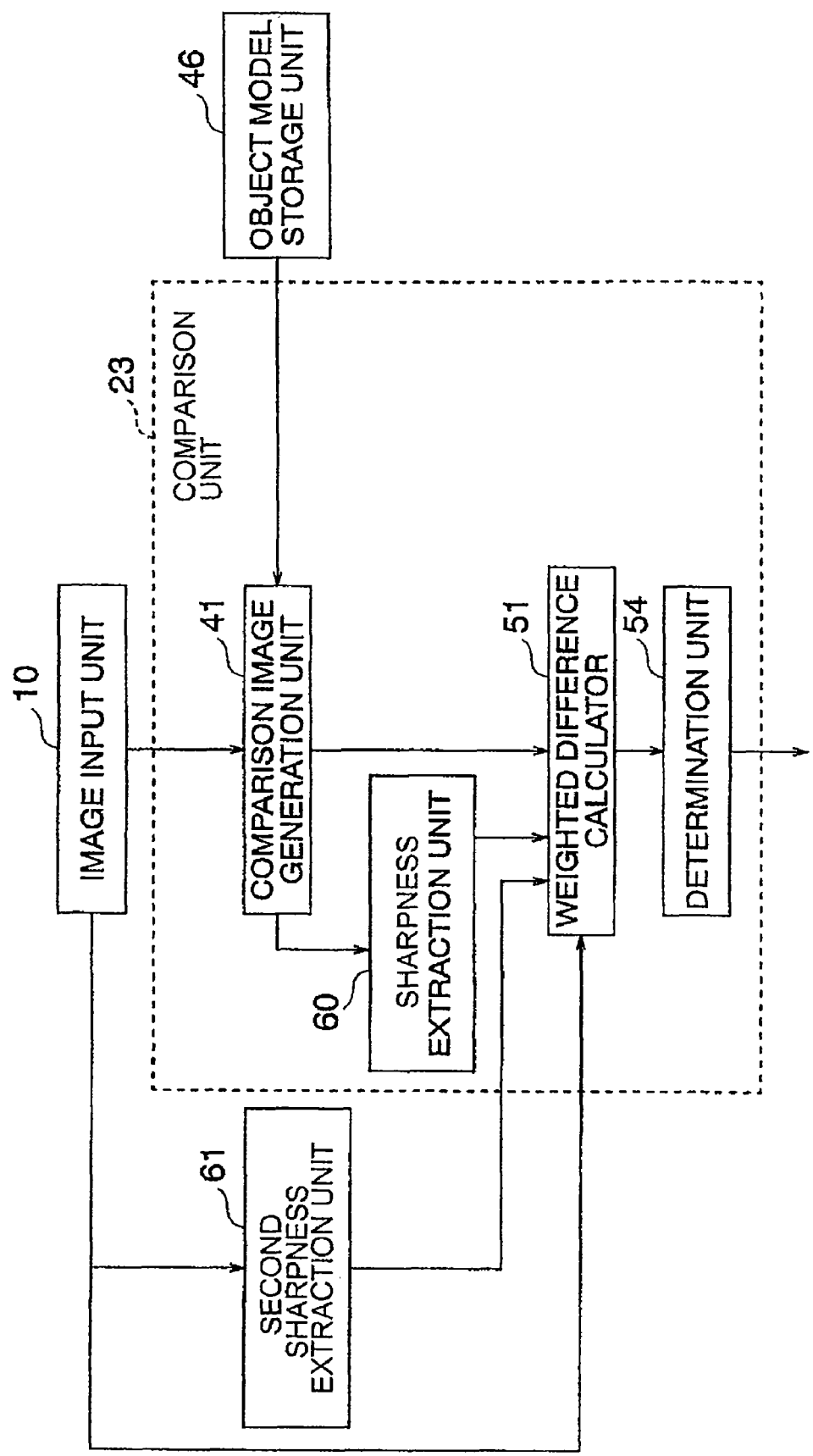
FIG. 13 is a block diagram showing configuration of an object comparison system according to a fourth embodiment of the present invention.

Referring to FIG. 13, an object comparison system according to the fourth embodiment of the present invention is composed of an image input unit 10, a second sharpness extraction unit 61, an object model storage unit 46, and a comparison unit 23. The comparison unit 23 includes a comparison image generation unit 41, a sharpness extraction unit (first sharpness extraction unit) 60, a weighted difference calculator 51, and a determination unit 54.

Similarly to the third embodiment, the fourth embodiment also takes the configuration in which the pose candidate decision unit 30 in the second embodiment is omitted in consideration of the comparison performed when the object pose variation is low. As mentioned in the above, the comparison when the object pose variation is low means that comparison is performed only on images of an object taken from the front, for example.

The image input unit 10, the second sharpness extraction unit 61, and the weighted difference calculator 51 execute the same processing as the counterparts of the second embodiment described in FIG. 9 do. The object model storage unit 46, the comparison image generation unit 41, and the sharpness extraction unit 60 execute the same processing as the counterparts of the third embodiment described in FIG. 11 do.

A detailed description will be made on the overall operation of one-to-one comparison according to the fourth embodiment with reference to FIGS. 13 and 14.

Figure 14:
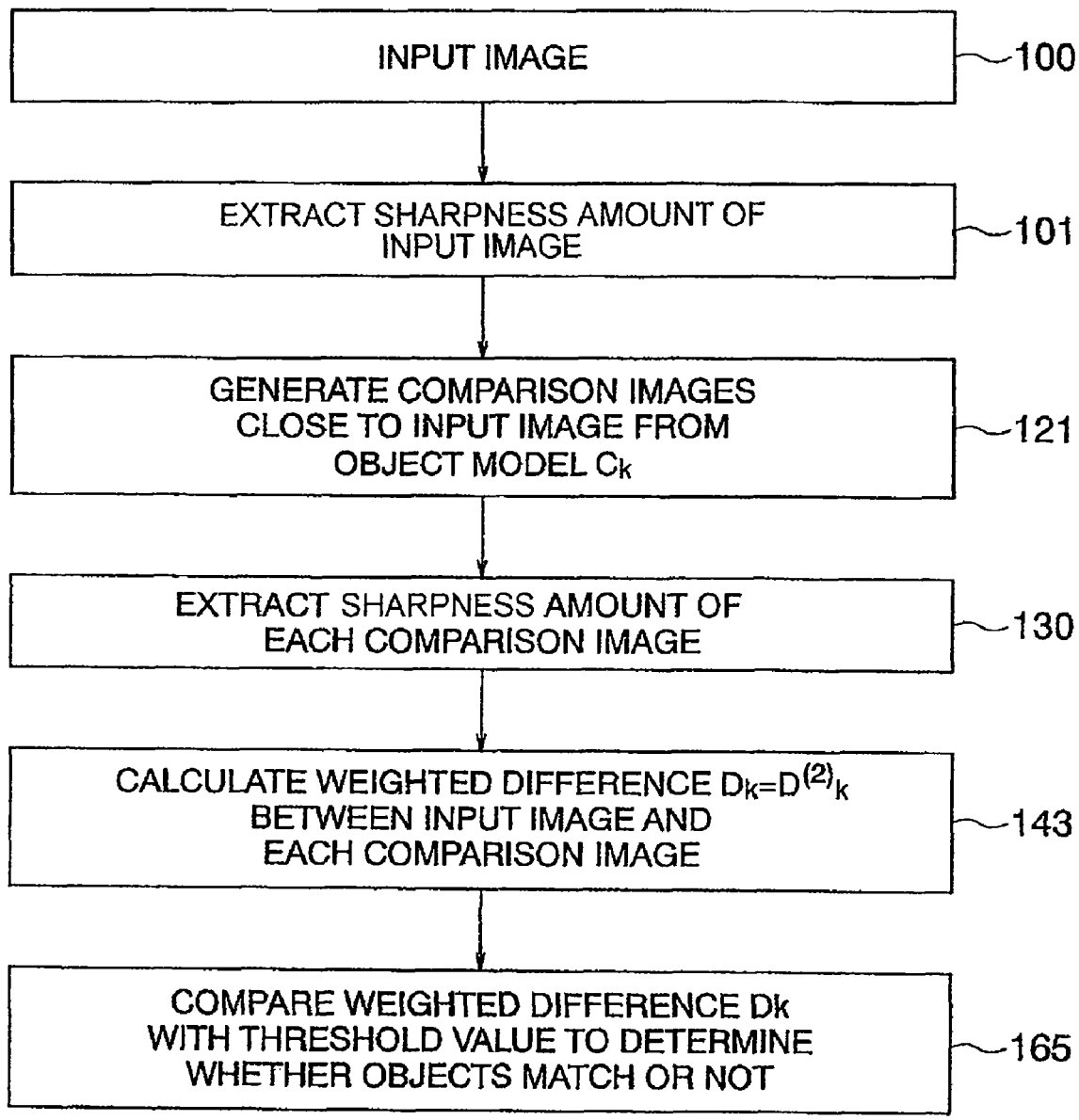
FIG. 14 is a flowchart for explaining the operation of the one-to-one comparison according to the fourth embodiment.

Firstly, an input image is obtained by the image input unit 10 (step 100 of FIG. 14). The second sharpness extraction unit 61 then extracts a second sharpness amount reflecting the sharpness from the input image (step 101). Subsequently, the comparison image generation unit 41 generates a plurality of comparison images close to the input image from an object model $C_k$ obtained from the object model storage unit 46 (step 121). The sharpness extraction unit 60 extracts a first sharpness amount reflecting the sharpness from each of the generated comparison images (step 130). The weighted difference calculator 51 calculates, for each of the comparison images, weighted difference $D_k = D^{(2)}_k$ by using the input image and the generated comparison image, the second sharpness amount of the input image, and the first sharpness amount of the comparison image (step 143). Finally, the determination unit 54 compares the weighted difference obtained by the calculation with a preset threshold value to determine whether or the object of the object model is the same as the object of the input image (step 165).

In the case of one-to-N comparison, the operation is substantially the same as that described in FIG. 5 except that the three-dimensional object model in the one-to-N comparison is replaced by the object model. Therefore, the description thereof is omitted.

A description will be made of advantageous effects of the fourth embodiment.

In the fourth embodiment, the difference between the second sharpness amount of the input image and the first sharpness amount of the comparison image is weighted in the calculation of the difference between the input image and the comparison image. Therefore, if the object of the object model does not match the object of the input image, the generated difference tends to become great, and thus the comparison can be performed with high precision.

Although a one-dimensional sharpness amount is used as the sharpness amount in the second and fourth embodiments described above, a higher-dimensional sharpness amount may be used. For example, the edge image may be represented by a higher-dimensional sharpness amount so that the difference in the sharpness amount is obtained for each pixel or each small area. Additionally, the characteristic point cannot be extracted stably if the image is not clear. Therefore, the characteristic point may be used as the sharpness amount reflecting the sharpness. The characteristic point is typically set at a position in the eye, the nose, or the mouth in case of a face, and can be automatically extracted by using a known face characteristics extracting method. The face characteristics extracting method is for example disclosed in "Automatic Extracting and Tracking The Facial Feature Points", Inada et al., January, 2001, Tech Rep. IEICE, PRMU 2000-151. The difference of the characteristic point can be calculated by using the coordinate value of the characteristic point as the characteristic or the sharpness amount, using Euclidean distance or the like.

Further, in any of the embodiments described above, the number of extracted characteristic points may be used as the sharpness amount.

In the above-embodiments, the three-dimensional object models or the object models are prestored, and the image is input through the mage input unit. The present invention is also applicable to the case in which images are prestored in a storage device, and a three-dimensional object model or object model is input through a separate input unit. The present invention is further applicable to the case in which both an image and a three-dimensional object model or object model are input through an input unit.

It will be obvious that the functions of the components of the object pose estimation and comparison system according to the present invention can be realized by hardware. The functions of the components may be realized by software as well. Specifically, an pose estimation and comparison program (application) for executing the functions of the components is loaded in a memory of the computer processor so that the computer processor is controlled based on the pose estimation and comparison program. The pose estimation and comparison program is recorded in a magnetic disk, a semiconductor memory, or other recording medium, and loaded into the computer processor from the recording medium to control the operation of the computer processor. The functions as described above can be realized in this manner. The same can be applied to an object pose estimation program and an object comparison program.

The present invention has advantages as described below.

Highly precise pose estimation and comparison are possible for object images taken at various poses and under various illumination conditions. This is firstly because a first sharpness amount reflecting the sharpness is extracted from a plurality of comparison images generated from an object model and is applied to the calculation of difference, whereby the difference tends to become great if the object of the object model does not match the object of the input image. When the object model used to generate the comparison images is of the same object as the object of the input image, and the estimated pose matches, the generated comparison image can be expected to be a clear image. Therefore, the accuracy of the pose estimation and comparison can be improved by using the first sharpness amount reflecting the sharpness in the calculation of difference.

Secondly, it is because, when the first and second sharpness amounts reflecting the sharpness are extracted from the comparison image and the input image, respectively, and applied to the calculation of difference, a large difference is apt to occur if the object of the object model does not match the object of the input image. If the object model used to generate the comparison image is of the same object as the object of the input image, and the estimated poses match, the sharpness of the generated comparison image can be expected to be close to the sharpness of the input image. Therefore, the accuracy of the pose estimation and comparison can be improved by using the first and second sharpness amounts reflecting the sharpness in the calculation of difference.

The invention claimed is:

1. A pose estimation system for performing object pose estimation by comparing an input image with a three-dimensional object model, the pose estimation system comprising:
a pose candidate decision unit for generating at least one pose candidate;
a comparison image generation unit for generating, according to the generated pose candidate, a plurality of comparison images similar to the input image, while projecting the three-dimensional object model to a two-dimensional image;
a first sharpness extraction unit for extracting a first sharpness amount reflecting the sharpness from each of the plurality of comparison images;
a weighted difference calculator for calculating a plurality of weighted differences by weighting the first sharpness amount to the difference between the input image and each of the comparison images;
a determination unit for selecting a comparison image having the smallest weighted difference among the plurality of weighted differences and estimating an optimal pose based on the selected comparison image; and
a second sharpness extraction unit for extracting a second sharpness amount reflecting the sharpness from the input image,
wherein the weighted difference calculator calculates a plurality of weighted differences by weighting the difference between the second sharpness amount of the input image and the first sharpness amount of each of the comparison images to the difference between the input image and the comparison image, and
wherein the first and second sharpness amounts are defined by a ratio of a number of pixels whose edge intensity is a threshold value or higher to the total number of pixels, a range of brightness values, dispersion of brightness values, or a number of characteristic points.

2. The pose estimation system according to claim 1, wherein the weight becomes higher as the sharpness of the image becomes higher in the weighted difference calculation.

3. A pose estimation system for performing object pose estimation by comparing an input image with a three-dimensional object model, the pose estimation system comprising:
- a pose candidate decision unit for generating at least one pose candidate;
- a comparison image generation unit for generating, according to the generated pose candidate, a plurality of comparison images similar to the input image, while projecting the three-dimensional object model to a two-dimensional image;
- a first sharpness extraction unit for extracting a first sharpness amount reflecting the sharpness from each of the plurality of comparison images;
- a weighted difference calculator for calculating a plurality of weighted differences by weighting the first sharpness amount to the difference between the input image and each of the comparison images;
- a determination unit for selecting a comparison image having the smallest weighted difference among the plurality of weighted differences and estimating an optimal pose based on the selected comparison image; and
- a second sharpness extraction unit for extracting a second sharpness amount reflecting the sharpness from the input image,
- wherein the weighted difference calculator calculates a plurality of weighted differences by weighting the difference between the second sharpness amount of the input image and the first sharpness amount of each of the comparison images to the difference between the input image and the comparison image, and
- wherein the first and second sharpness amounts are defined by an edge image or a characteristic point.

4. A pose estimation and comparison system employing the pose estimation system according to claim 1, wherein the determination unit further performs object comparison by comparing the minimum weighted difference of the estimated optimal pose with a predetermined threshold value.

5. The pose estimation and comparison system according to claim 4, wherein the weight becomes higher as the sharpness of the image becomes higher in the weighted difference calculation.

6. A pose estimation and comparison system employing the pose estimation system according to claim 3, wherein the determination unit further performs object comparison by comparing the minimum weighted difference of the estimated optimal pose with a predetermined threshold value.

7. A comparison system for performing object comparison by comparing an input image with an object model, comprising:
- a comparison image generation unit for generating a plurality of comparison images similar to the input image from the object model;
- a first sharpness extraction unit for extracting a first sharpness amount reflecting the sharpness from each of the plurality of comparison images;
- a weighted difference calculator for calculating a plurality of weighted differences by weighting the first sharpness amount to the difference between the input image and each of the comparison images;
- a determination unit for performing object comparison by comparing the calculated plurality of weighted differences with a preset threshold value; and
- a second sharpness extraction unit for extracting a second sharpness amount reflecting the sharpness from the input image;
- wherein the weighted difference calculator calculates a plurality of weighted differences by weighting the difference between the second sharpness amount of the input image and the first sharpness amount of each of the comparison images to the difference between the input image and the comparison images, and
- wherein the first and second sharpness amounts are defined by a ratio of a number of pixels whose edge intensity is a threshold value or higher to the total number of pixels, a range of brightness values, dispersion of brightness values, or a number of characteristic points.

8. The comparison system according to claim 7, wherein the weight becomes higher as the sharpness of the image becomes higher in the weighted difference calculation.

9. A comparison system for performing object comparison by comparing an input image with an object model, comprising:
- a comparison image generation unit for generating a plurality of comparison images similar to the input image from the object model;
- a first sharpness extraction unit for extracting a first sharpness amount reflecting the sharpness from each of the plurality of comparison images;
- a weighted difference calculator for calculating a plurality of weighted differences by weighting the first sharpness amount to the difference between the input image and each of the comparison images;
- a determination unit for performing object comparison by comparing the calculated plurality of weighted differences with a preset threshold value; and
- a second sharpness extraction unit for extracting a second sharpness amount reflecting the sharpness from the input image;
- wherein the weighted difference calculator calculates a plurality of weighted differences by weighting the difference between the second sharpness amount of the input image and the first sharpness amount of each of the comparison images to the difference between the input image and the comparison images, and
- wherein the first and second sharpness amounts are defined by an edge image or a characteristic point.

10. A pose estimation method for performing object pose estimation by comparing an input image with a three-dimensional object model, the method comprising:
- generating at least one pose candidate;
- generating, according to the pose candidate, a plurality of comparison images similar to the input image, while projecting the three-dimensional object model to a two-dimensional image;
- extracting a first sharpness amount reflecting the sharpness from each of the plurality of comparison images;
- calculating a plurality of weighted differences by weighting the first sharpness amount to the difference between the input image and each of the comparison images;
- selecting a comparison image having the smallest weighted difference among the plurality of weighted differences;
- estimating an optimal pose based on the selected comparison image; and
- extracting a second sharpness amount reflecting the sharpness from the input image,
- wherein a plurality of weighted differences are calculated by weighting the difference between the second sharpness amount of the input image and the first sharpness amount of each of the comparison images to the difference between the input image and the comparison image in the calculation of the weighted differences, and
wherein the first and second sharpness amounts are defined by a ratio of a number of pixels whose edge intensity is a threshold value or higher to the total number of pixels, a range of brightness values, dispersion of brightness values, or a number of characteristic points.

* * * * *